Feb. 6, 1923.
F. G. ALBORN.
HOUSING FOR MACHINERY.
FILED JAN. 16, 1918.
1,444,020
2 SHEETS-SHEET 1
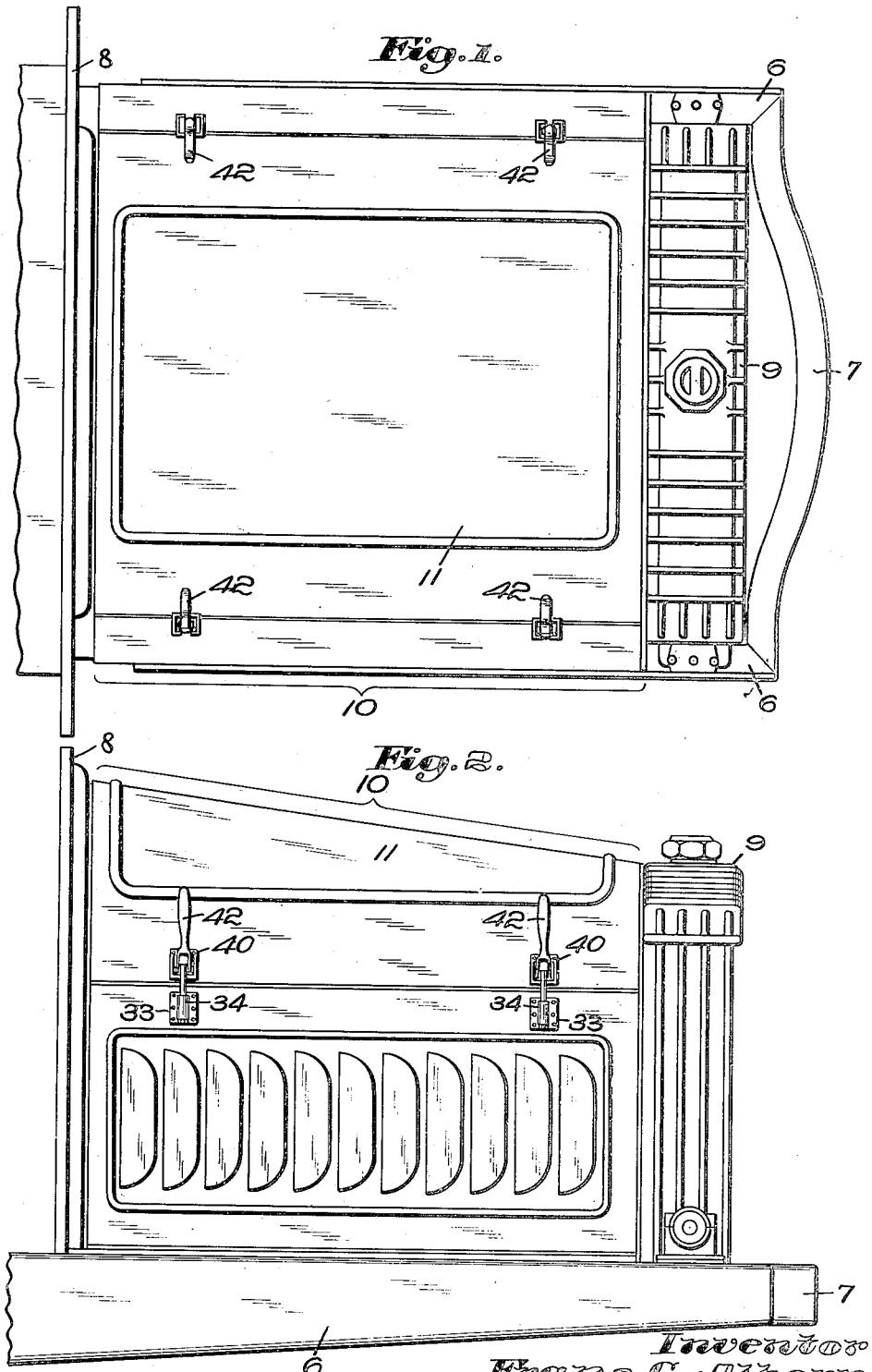

Feb. 6, 1923.
F. G. ALBORN.
HOUSING FOR MACHINERY.
FILED JAN. 16, 1918.
1,444,020
2 SHEETS-SHEET 2
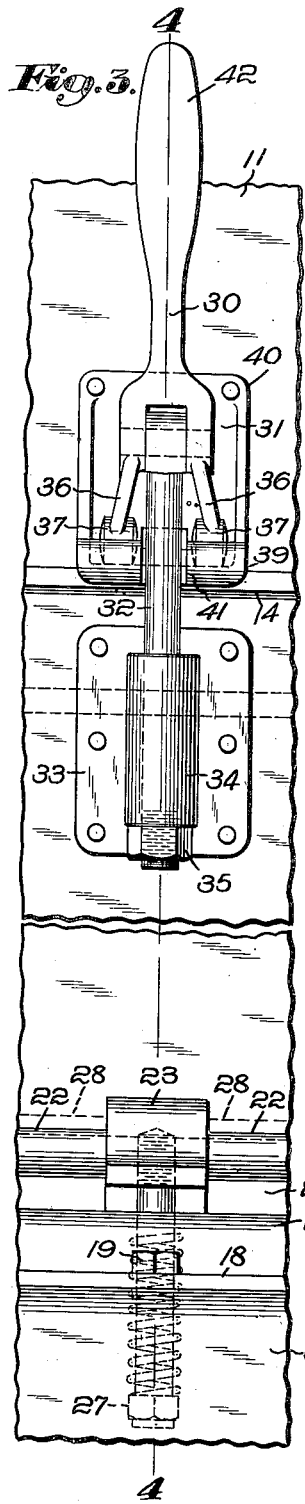
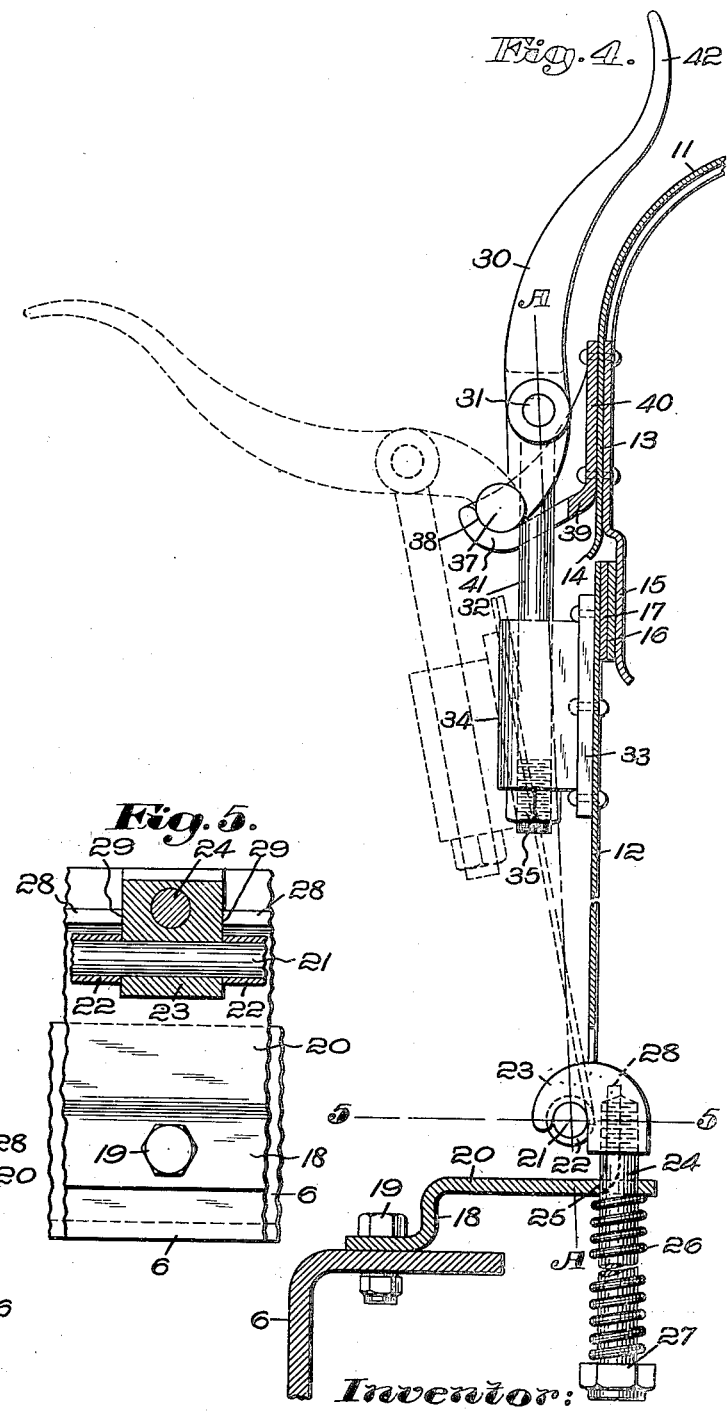
Inventor:
Frans G. Alborn,
by [signature]
Attys.

Patented Feb. 6, 1923.

1,444,020

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

HOUSING FOR MACHINERY.

Application filed January 16, 1918. Serial No. 212,036.

*To all whom it may concern:*

Be it known that I, FRANS G. ALBORN, a citizen of the United States, and a resident of Milford, in the county of New Haven and State of Connecticut, have invented an Improvement in Housings for Machinery, of which the following description, in connection with the accompanying drawings, is a specification, like characters on the drawings representing like parts.

This invention relates to housings for machinery, and is more especially though not exclusively concerned with a hood or bonnet for protecting the power plant of a motor vehicle, although it is to be understood that the invention is by no means restricted to such use, but that it is susceptible of general application.

My invention will be best understood by reference to the following description, when taken in connection with the accompanying drawings of one specific embodiment thereof, while its scope will be more particularly pointed out in the appended claims.

In the drawings:

Fig. 1 is a plan of a housing embodying my invention;

Fig. 2 is a side elevation of the same;

Fig. 3 is a side elevation on an enlarged scale of a portion of the housing;

Fig. 4 is a sectional view on line 4—4 of Fig. 3, showing in full lines the parts as they appear in their normal position, and in dotted lines as they appear in a position preliminary to the closing and locking of the housing; and Fig. 5 is a detail sectional view on line 5—5 of Fig. 4.

Referring to the drawings, and to the embodiment of my invention which I have selected for illustrative purposes, I have there shown the forward portion of a motor vehicle having a frame comprising usual side frame members 6—6 connected by a transverse member 7. On this frame is supported a housing comprising a rear support 8, herein in the form of a dashboard, and a front support herein in the form of a radiator 9, connected to each other by a hood or bonnet designated generally by the numeral 10. The entire structure, boardly considered, constitutes a housing which may be used as a protecting enclosure for machinery and other things.

The hood or bonnet may comprise any suitable number of walls or sections, but in the present example I have selected for illustration one having a top section or roof 11, and two side walls or side sections 12. The top section or roof 11 is supported at its front and rear ends on a dash-board 8 and radiator 9, and is preferably extended downward in vertical planes at both sides to form depending side walls 13. These depending portions each engage lateral portions of the dashboard and radiator, and prevent the top section or roof from shifting sidewise and rising on one side or the other when the hood or bonnet is opened on that side. The depending portions 13 are provided with outwardly projecting lips 14, best shown in Fig. 4, extending beyond the upper edges of the walls 12, and constituting means for shedding water and preventing its entrance into the joint between the walls 12 and 13. Preferably, the wall 13 is provided with a depending portion 15, which overlaps the joint on the inside of the hood or bonnet, and constitutes a further means to guard against the entrance of water, as well as dust, dirt and other foreign substances, it being provided for this purpose with a suitable pad 16 resting against a similar pad 17 secured to the inner face of the wall 12, thus forming a tight but non-squeaking joint.

Mounted on the frame members 6 are sills 18, which may be secured thereto by any suitable means, herein a plurality of bolts 19. Each of these sills is provided with a web 20, which extends horizontally inward beyond the corresponding side frame member 6, as best shown in Fig. 4, to a point preferably inwardly beyond the lower edge of the side wall 12, and the latter is attached to the sill and to the top section 11 by suitable readily attachable and detachable connections whereby any or all of the sections may be removed to expose the power plant or other enclosed machinery. In its preferred form, the lower connection comprises suitable pivotal means which in the present example comprises a horizontally-extending rod 21 constituting a pintle about which the lower edge of the side wall is rolled, as at 22. This rod may cooperate with suitable means supported on the sill 18 to form a hinge for the side wall, such means in the present example comprising a plurality of hooks 23 hooked over and upon the rod, as best shown in Figs. 3 and 4. By this means, it is possible to unhook the rod 21 from the hook 23, and remove the side wall 12 altogether.

The hooks 23 may be otherwise suitably connected to the sill 20, but in the present example I have shown a resilient connection comprising a plurality of plungers 24 secured to the hooks 23 and extending in a downward direction through suitable openings 25. Suitable springs 26, encircling the plungers 24 bear at their upper ends against the under side of the sill, and at their lower ends against suitable abutments herein in the form of nuts 27 carried by the plungers. In the normal position of the parts, these springs are under tension sufficient to hold the bonnet sections firmly in place, and to prevent any possible rattling. Preferably, suitable means are provided to prevent the hooks 23 from turning about the axis of the plungers 24. In the present example, the horizontally extending web 20 of the sill 18 is provided with an upwardly directed flange 28, which extends past and overlaps the lower edge of the wall 12, so as to exclude water and foreign substances at this point. This flange may serve as a convenient means for preventing the hooks 23 from turning, and to this end, said flange is notched or cut away, as best shown in Fig. 5, to form two side walls 29 which are struck up to embrace opposite faces of the hook 23, as shown in Fig. 5. Thus it is evident that the latter is free to move vertically, guided by these walls, but is prevented from turning and hence the hooks are always presented in the proper direction to receive the pivotal rod 21.

The connection between the walls 12 and 13 may take other forms, but in the present example, I have shown suitable latching or locking means comprising a plurality of levers 30 carried by and suitably fulcrumed on the wall 12, and connected to the wall 13 in such a manner as to urge the wall 12 in an upward direction, thereby to compress the springs 26 and finally to lock the wall 12 to the wall 13. In the present instance, each of the locking levers 30 is fulcrumed on a pivot 31 carried by the upper end of a rod 32 secured by appropriate means to the wall 12. Such means herein comprises a plate 33, having a lug 34 into which the rod 32 is threaded, while a check-nut 35 screwed onto the lower end of the rod prevents accidental turning movement of the latter in the lug. This threaded connection forms a convenient means for adjusting the relation between the walls 12 and 13 in a vertical direction. Preferably the lever 30 is forked or bifurcated to provide a pair of arms 36 provided at their lower ends with cylindrical trunnions 37 which are normally seated in correspondingly-shaped seats 38 in a laterally-extending lug 39 of a bracket 40, the latter being secured to the depending wall 13 of the top section 11 of the hood or bonnet. The rod 32 is interposed between the arms 36, as best shown in Fig. 3, and the lug 39 is provided with a slot 41 to receive said rod, as best shown in Figs. 3 and 4.

It should be observed by reference to Fig. 4 that the axis of the trunnions 37 is at the outer side of a plane A—A containing the axes of the pivots 21 and 31. This being so, it is obvious that the downward pull exerted by the springs 26 tends to maintain the levers 30 in their normal positions, as well as to hold the bonnet sections in their proper relative positions, and to keep the top section firmly seated on its supports. The levers 30 are provided with grasping portions or handles 42 which, when swung in a downward direction from the positions shown in full lines in Fig. 4 toward the position shown in dotted lines therein, cause the side wall 12 to swing in an outward direction about its pivot 21, and the plane A—A to cross the axis of the trunnions 37, whereupon the downward pull exerted by the springs tends to pull the levers in a downward direction, and to assist in detaching them from the lugs 39. The effect of this is well illustrated in Fig. 4. When this has been done, the side wall 12 can either be swung downward into a generally horizontal position, thereby to afford access to the interior of the hood or bonnet, or if desired, the side wall may be removed altogether by simply unhooking the same from the hooks 23. If access to one side only is desired, it is unnecessary to disturb the remaining sections of the hood or bonnet, since the latter will be firmly held in their proper relative positions. Either or both side walls may be removed without disturbing the top section or roof, or the latter may be removed without removing the side walls, or all of the sections may be entirely removed at the will of the mechanician.

The side walls are again fastened by a reversal of the foregoing operation: First the trunnions 37 are seated in their seats 38, and then the levers 30 are swung to the position shown in full lines in Fig. 4. Just as soon as the plane A—A containing the axis of the pivots 21 and 31 crosses the axis of the trunnion 37, the pull exerted by the springs 26 aids in carrying the levers to their final position. It should here be observed that the rod or bonnet as a whole is self-adjusting, and that while a definite relation between the side and top sections is always maintained, yet the bonnet accommodates itself to variations in the hood or bonnet supports within reasonable limits, and moreover that great accuracy in the sizes of the bonnet sections is not required. Under no circumstances can the cooperating edges of the walls 12 and 13 spread apart on the one hand or collide on the other, but they are always maintained in their proper relationship to exclude foreign matter. It should also be evident that the cylindrical shape of the trunnions 37 ensures ease of operation, as well as minimum of wear between the trunnions and their seats.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. A housing comprising, in combination, a plurality of hood-sections including a top-section and two side-sections, means to support said top-section, two sills, means yieldingly connecting said side-sections to said sills, respectively, and means to urge said side-sections in an upward direction and to connect them with said top-section.

2. A housing comprising, in combination, a plurality of hood-sections including a top-section and two side-sections, means to support said top-section, two sills, yielding pivots connecting said side-sections to said sills, respectively, and means to urge said side-sections in an upward direction and to connect them with said top-section.

3. A housing comprising, in combination, a plurality of hood-sections including a top-section and two side-sections, means to support said top-section, two sills, pivots and springs connecting said side-sections to said sills, respectively, and means to urge said side-sections in an upward direction and to connect them with said top-section.

4. A housing comprising, in combination, a plurality of hood-sections including a top-section and two side-sections, means to support said top-section, two sills, pivots and spring plungers connecting said side-sections to said sills, respectively, and means to urge said side-sections in an upward direction and to connect them with said top-section.

5. A housing comprising, in combination, a plurality of hood-sections including a top-section and two side-sections, means to support said top-section, two sills, hooks connecting said side-sections to said sills, respectively, and means to urge said side-sections in an upward direction and to connect them with said top-section.

6. A housing comprising, in combination, a plurality of hood-sections including a top-section and two side-sections, means to support said top-section, two sills, hooks and pivots connecting said side-sections to said sills, respectively, and means to urge said side-sections in an upward direction and to connect them with said top-section.

7. A housing comprising, in combination, a plurality of hood-sections including a top-section and two side-sections, means to support said top-section, two sills, yieldingly mounted hooks connecting said side-sections to said sills, respectvely, and means to urge said side-sections in an upward direction and to connect them with said top-section.

8. In a housing of the class described, the combination of front and rear supporting elements, a frame on which said elements are mounted, a roof supported at its front and rear ends on said supporting elements, two side walls, vertically yielding resilient means connecting the lower edges of said side walls to said frame, and means to draw said side walls in an upward direction to stress said resilient means and to secure the upper edges of said side walls to said roof.

9. A housing of the class described comprising in combination, a top-section, means to support said top-section, a side-section, a sill, means including a hook connecting said side-section to said sill and pivoted to turn about a generally upright axis, and means to limit turning movement of said hook about said axis.

10. A housing of the class described comprising, in combination, a top-section, means to support said top-section, a side-section, a sill, means including a hook connecting said side-section to said sill, means loosely connecting said hook to said sill, and means engaging said hook laterally to maintain the same in proper position for cooperation with said side section when detached therefrom.

11. A housing of the class described comprising, in combination, a top-section, means to support said top-section, a side-section, a sill having a flange provided with an opening, and means detachably connecting said side-section to said sill, the last mentioned means being held against turning movement by the walls of said opening.

12. A housing of the class described comprising, in combination, a plurality of separable sections, one of which is hingedly supported, and means to secure said sections together, said means including an open seat carried by one of said sections, and a lever having a fulcrum rigidly carried by said hinged section, said lever having a trunnion provided with a cylindrical bearing surface mounted to turn on and laterally detachable from said seat.

13. A housing of the class described comprising, in combination, a plurality of separable sections, one of which is hingedly supported, and means to secure said sections together, said means including an open seat carried by one of said sections, and a lever having a fulcrum rigidly carried by said hinged section, said lever having a trunnion provided with a cylindrical bearing surface mounted to turn in and laterally detachable from a correspondingly shaped surface on said seat.

14. A housing of the class described comprising, in combination, a plurality of separable sections, one of which is hingedly supported, and means to secure said sections together, said means including a pair of open seats carried by another section, a lever provided with a pair of arms engaging said seats, and a lever support rigidly carried by said hingedly-supported section and extending between said arms.

15. A housing of the class described comprising, in combination, an upper and a lower section, said upper section being provided with two depending portions, one of which overlaps the lower section on the inside of said housing and the other of which projects laterally outward beyond the upper edge of said lower section, and means to connect said sections to each other.

In testimony whereof, I have signed my name to this specification.

FRANS G. ALBORN.